US012654984B2

(12) United States Patent
Chen et al.

(10) Patent No.: US 12,654,984 B2
(45) Date of Patent: Jun. 16, 2026

(54) BUILDING SYSTEM WITH ELEVATOR CALL ENTRY VIA OFFLINE QR CODE CREDENTIAL

(71) Applicant: Inventio AG, Hergiswil (CH)

(72) Inventors: Samuel Chen, Hong Kong (CN); Jack Wong, Hong Kong (CN)

( * ) Notice: Subject to any disclaimer, the term of this patent is extended or adjusted under 35 U.S.C. 154(b) by 795 days.

(21) Appl. No.: 18/040,660

(22) PCT Filed: Jul. 29, 2021

(86) PCT No.: PCT/EP2021/071245

§ 371 (c)(1),
(2) Date: Feb. 6, 2023

(87) PCT Pub. No.: WO2022/033882

PCT Pub. Date: Feb. 17, 2022

(65) Prior Publication Data

US 2023/0278828 A1 Sep. 7, 2023

(30) Foreign Application Priority Data

Aug. 13, 2020 (EP) .................................... 20190840

(51) Int. Cl.
*B66B 1/46* (2006.01)
*B66B 1/34* (2006.01)

(52) U.S. Cl.
CPC ............ *B66B 1/468* (2013.01); *B66B 1/3461* (2013.01); *B66B 2201/4638* (2013.01)

(58) Field of Classification Search
CPC .......... B66B 2201/4638; B66B 1/3461; B66B 1/468

(Continued)

(56) References Cited

U.S. PATENT DOCUMENTS 9,077,716 B2 7/2015 Myers et al.
2011/0311052 A1 12/2011 Myers et al.

(Continued)

FOREIGN PATENT DOCUMENTS

CN 1976855 A 6/2007
JP 2005280882 A 10/2005

(Continued)

OTHER PUBLICATIONS

Chen et al. (WO 2022033882 A1) Building System With Elevator Call Entry Via Offline QR Code Credential (Year: 2022).*

(Continued)

*Primary Examiner* — Jorge L Carrasquillo
(74) *Attorney, Agent, or Firm* — Schlee IP International, PC; Alexander R. Schlee; Pascal A. Schlee

(57) ABSTRACT

A building system has an elevator system controlled by a controller system to move an elevator car between building floors, and a registration computer system communicatively coupled to the controller system. The registration computer system generates an activation (QR) code that a user requesting elevator service scans with a mobile communications device. The activation code encodes user information including access rights of the user in the building. A software application executable by the mobile communications device responds to the activation code by generating a graphical user interface with displayed content determined by the user information in the activation code. The software application generates an optical credential upon the user specifying the elevator service. A credential acquisition unit reads the optical credential from the mobile communications device, whereby the controller system causes the elevator system to perform the specified elevator service upon determining that the optical credential is valid.

15 Claims, 2 Drawing Sheets

(58) Field of Classification Search
USPC .......................................................... 187/380
See application file for complete search history.

(56) References Cited

U.S. PATENT DOCUMENTS

| | | | | |
|---|---|---|---|---|
| 2012/0068818 | A1* | 3/2012 | Mizon | G07C 9/20 340/5.61 |
| 2016/0009525 | A1* | 1/2016 | DePaola | B66B 1/468 340/5.61 |

FOREIGN PATENT DOCUMENTS

| | | | |
|---|---|---|---|
| JP | 2009057179 | A | 3/2009 |
| JP | 2018080033 | A | 5/2018 |
| KR | 20200089057 | A | 7/2020 |
| WO | 2008046173 | A1 | 4/2008 |
| WO | 2015049186 | A1 | 4/2015 |

OTHER PUBLICATIONS

Wu et al. (CN 109399412 A) Method And System Of Intelligent Home System Based On Control Terminal Linkage Calling Of Elevator (Year: 2019).*
Borba et al. (WO 2008046173 A1) Elevators Users Access and Tracking Control System (Year: 2008).*

* cited by examiner

BUILDING SYSTEM WITH ELEVATOR CALL ENTRY VIA OFFLINE QR CODE CREDENTIAL

FIELD

The present disclosure of various embodiments generally relates to a building system having elevator system and its operation. More specifically, the various embodiments described herein relate to a building system providing improved passenger comfort and confidence when using an elevator, and a method of controlling the operation of such a building system.

BACKGROUND

Multi-story residential and commercial buildings often have elevator systems to transport users (e. g., tenants and visitors) from a boarding floor to a destination floor. Elevator systems and elevator control technologies implemented therein are generally known. Some of these buildings may further have a physical building control system to allow only authorized users access the building and/or areas within the building. Upon a user presenting some form of credential (e. g., key, optical code (e. g., barcode, QR code), RFID badge or biometric feature), a physical building control system releases or unlocks a physical barrier (e. g., a gate, door, or turnstile) to grant access to the authorized user. U.S. Pat. No. 9,077,716 describes a building control system, in which a mobile electronic device communicates with an electronic door lock by means of a Bluetooth or WLAN radio link, and with a web server by means of a WAN (Wide Area Network) radio link to open the electronic lock. For example, one of these building control systems may be configured to automatically enter an elevator call for the authorized user based on a default destination stored in a user profile.

In addition to providing transportation and physical access control, building owners and/or building operators (building management) provide for a safe and clean environment within buildings. Of particular concern are operating panels and push buttons users must touch to request a building service, such as an elevator trip. Users may worry that these panels and buttons contribute to the spreading of bacteria and/or viruses to healthy users. To address such concerns, building management may enhance its cleaning and disinfection efforts.

Such efforts and procedure may increase a user's confidence when seeking to use a building service. However, some of the mentioned systems using credentials are rather complex, and cleaning and disinfection efforts may still not provide sufficient comfort to users. There is, therefore, a need for a technology that overcomes at least some of these issues.

SUMMARY

One aspect of such technology relates to a building system having an elevator system. The building system includes a controller system configured to control the elevator system to move an elevator car between floors of a building, and a registration computer system communicatively coupled to the controller system. The registration computer system is configured to generate an activation code for a user requesting elevator service, to store data associated with the activation code, and to have at least one system component of the registration computer system user-accessibly located in a public zone of the building. The activation code encodes user information including at least one of a user identity, an encryption key and access rights of the user in the building, and is configured to activate, upon being provided to a mobile communications device of the user located in proximity of the at least one system component, a software application installed on and being executable by the mobile communications device. The activated software application is configured to generate a graphical user interface on a display of the mobile communications device, wherein displayed content of the graphical user interface is predetermined solely by the coded user information of the activation code. Further the software application is configured to generate an optical credential upon the user specifying the elevator service, wherein the optical credential includes the user information. The building system includes further a credential acquisition unit communicatively coupled to the controller system and configured to acquire the optical credential from the mobile communications device presented by the user to the credential acquisition unit. The controller system is configured to cause the elevator system to perform the specified elevator service upon determining that the optical credential is valid.

Another aspect relates to method of operating a building system having an elevator system. The building system includes a controller system configured to control the elevator system, a registration computer system communicatively coupled to the controller system, and a credential acquisition unit communicatively coupled to the controller system. According to the method, the registration computer system generates an activation code based on information contained in a user profile stored for the user. The activation code encodes user information including at least one of a user identity, an encryption key and access rights of the user in the building. The activation code is released by the registration computer system to be obtained by a mobile communications device of the user. The obtained activation code activates a software application installed on and being executable by the mobile communications device. The activated software application generates a graphical user interface on a display of the mobile communications device, wherein displayed content of the graphical user interface is predetermined solely by the coded user information of the activation code. The software application further generates and displays an optical credential upon the user specifying an elevator service, wherein the optical credential includes the user information. According to the method, the credential acquisition unit acquires the optical credential from the mobile communications device presented by the user, and the controller system controls the elevator system to perform the specified elevator service upon determining that the optical credential is valid.

The technology described herein allows a user to request an elevator service without having to touch elevator buttons or elevator operating panels. For example, the user can enter an elevator call using the user's familiar mobile communications device. Any touching for calling the elevator is, therefore, limited to touching the "personal" mobile communications device, and contributes to the user's confidence when seeking to use an elevator. In addition, the mobile communications device can be operated via a graphical user interface; this facilitates use of the technology described herein because users are usually accustomed to the use of such graphical user interfaces.

In certain embodiments, an optical code and an optical credential are used. The registration computer system releases the activation code, and the credential acquisition unit acquires the optical credential from the mobile communications device presented by the user. In one embodiment, the optical code and the optical credential are displayed as quick response (QR) codes. Users are also accustomed to such optical codes, and, therefore, intuitively know what to do when seeing an optical code, i. e., either scan it with the mobile communications device or present it to an electronic reading device. This facilitates use of the technology described herein.

Further, the activation code generated by the registration computer system includes essentially all information, in particular access rights, that allows the user to enter an elevator call to reach a desired destination in the building. At about the time the activation code is generated based on a user profile, the registration computer system generates the encryption key specifically for the user. The activation code conveys the encryption key to the mobile communications device which then uses it to encode the optical credential. After the optical credential has been read by the credential acquisition device, the encryption key is used by the controller system of the building system to verify the optical credential. This restricts copying of the optical credential and sharing it with other users.

The technology described herein provides further improved security for the building system as a whole in case the activation code and/or the optical credential are subject to unauthorized decoding or decrypting efforts (hacking). Since the encryption key is unique and specific for the user, obtaining the encryption key affects only the hacked activation code or optical credential, but not other codes or credentials. The registration computer system generates a new and independent encryption key for each request of an elevator service.

In addition, the technology described herein provides for an additional level of security for the building system. The validity or expiration of the activation code (i. e., the date/time its validity begins and ends) and the access rights are stored in a data storage device at about the time that the activation code is generated. When a user presents the optical credential, which includes information about the validity and the access rights, the controller system checks if the information from the read optical credential matches the information stored in the data storage device. Only if this is the case, the elevator service is performed.

Moreover, since the activation code essentially conveys all the information to the mobile communications device, the mobile communications device does not require a radio communications link for the purpose of requesting the elevator service. In response to the receipt of the activation code, the graphical user interface of the mobile communications displays the predetermined content, including the optical credential, without obtaining additional information external to the mobile communications device. That is, the technology described herein provides for offline use of the mobile communications device to request an elevator service.

The technology described herein is not limited to a particular elevator control technology. In one embodiment, the controller system is configured to control the elevator system according to an up/down control technology, wherein a first credential acquisition unit is arranged on a building floor to provide for entry of a floor call specifying a travel direction and calling an elevator car to the building floor, and wherein a second credential acquisition unit is arranged in the elevator car to provide for entry of a car call specifying a destination floor. In another embodiment using the up/down control technology, directional push-buttons are arranged on a building floor to provide for entry of a floor call specifying a travel direction and calling an elevator car to the building floor, and the credential acquisition unit is arranged in the elevator car to provide for entry of a car call specifying a destination floor. Alternatively, the controller system is configured to control the elevator system according to a destination call control technology, wherein the credential acquisition unit is arranged on a building floor to provide for entry of a floor call specifying a destination floor and calling an elevator car to the building floor.

DESCRIPTION OF THE DRAWINGS

Various aspects of the improved technology are described in greater detail below with reference to exemplary embodiments in conjunction with the drawings. In the figures, identical elements have identical reference numerals. In the figures.

FIGS. show 5A-5B a second embodiment of a graphical user interface displayed on the user's mobile communications device for use with an up/down elevator control technology.

DETAILED DESCRIPTION

Figure 1:
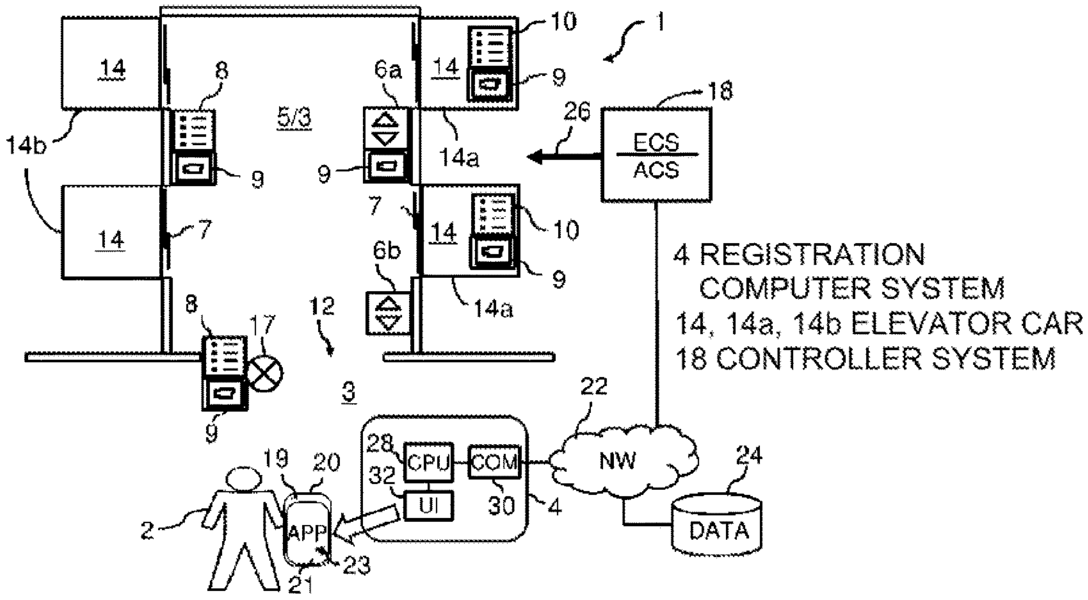
FIG. 1 shows a schematic illustration of an exemplary situation in a building having a building system.

FIG. 1 is a schematic illustration of an exemplary situation in a building having a building system 1 which may be configured to operate according to at least one of several system implementations and control technologies. For illustrative purposes, these system implementations and control technologies are all shown in FIG. 1. One of ordinary skill in the art will appreciate that less than the illustrated system implementations and control technologies, or only one of them, may be provided in a building.

The building system 1 may be configured for a variety of different applications. For example, the building system 1 may include an elevator system to perform an elevator service, e. g. to transport a user 2 from a boarding floor to a destination floor within a building. An elevator controller (ECS) controls the operation of the elevator system according to the control technology implemented in the elevator system. These control technologies are known to the skilled person; they are described herein only to the extent believed to be helpful for understanding the technology described herein.

Referring to the right-hand side of FIG. 1, the elevator system may be configured to operate according to a (conventional) up/down control technology. In that case, the elevator system has floor terminals 6*a*, 6*b* mounted on building floors in proximity to elevator doors 7, and elevator cars 14*a* that are equipped with car operating panels 10. The floor terminals 6*a*, 6*b* and the car operating panels 10 are communicatively coupled to the controller system 18. At a floor terminal 6*a*, 6*b* on a boarding floor, the user 2 can enter the travel direction (up/down) to call an elevator car 14*a* to the boarding floor; the up/down directions are depicted in FIG. 1 as triangles, which may be provided on push buttons or displayed on a touchscreen. At the car operating panel 10, the user 2—after boarding the elevator 14*a*—can enter a destination floor. The car operating panel 10 may have a plurality of individually numbered push buttons or numbered fields on a touch panel; floor labels on or next to these push buttons or fields, as depicted in FIG. 1, may specify names (persons, legal entities) or services (reception, dentist, restaurant, gym) located on the building floors.

Referring to the left-hand side of FIG. 1, the elevator system may be configured to operate according to a destination call control technology. In that case, the elevator system has floor terminals 8 mounted on building floors in proximity to elevator doors 7 or at an entrance 12 to an access-restricted zone 5, which is controlled by a gate 17. At a floor terminal 8 on a boarding floor, the user 2 can enter the destination floor to call an elevator car 14*b* to the boarding floor. Similar to a car operating panel 10, the floor terminal 8 may have a plurality of individually numbered push buttons or numbered fields on a touch panel, which may also be provided with floor labels. After entry of such a destination call, the elevator controller registers information that specifies the boarding floor and the destination floor. Inside the elevator car 14*b*, the user 2 does not have enter the destination floor, and any in-car operating panel usually does not provide for such entry of the destination floor.

In addition to the elevator system, the building system 1 may include a physical access control system configured to control whether a user 2 is authorized to access the access-restricted zone 5 and/or to use the elevator service. An access controller (ACS) controls the operation of the access control system. The elevator system and the physical access control system, or their respective functions, may be integrated into a single system. In FIG. 1 and for illustrative purposes, the elevator controller and the access controller are shown as being comprised in a controller system 18, which controls the building system 1, as illustrated by means of an arrow 26. It is contemplated, however, that depending on the building the access controller is optional. If provided in the building, the access controller, for example, grants the user 2 access to the access-restricted zone 5 and/or the elevator service if a credential presented by the user 2 is valid.

The access-restricted zone 5 may be an elevator hall where users 2 can transfer to and from one or more elevator cars 14. In FIG. 1, the entrance 12 separates a public zone 3, which is not subject to an access restriction, from the access restricted zone 5, wherein the gate 17 (with or without a physical barrier (such as a door, a revolving door, a turnstile)) at the entrance 12 controls access to the access-restricted zone 5. In one embodiment, the gate 17 and a floor terminal 8 may be arranged in close proximity to each other or in a common structure or housing, as illustrated in FIG. 1. In another embodiment, the gate 17 can be omitted if the elevator hall is not subject to access control; the elevator hall may then be viewed as a public zone 3, wherein the inside of an elevator car 14 may be viewed as an access-restricted zone 5. It is contemplated that a building may have one or more public zones 3 and/or one or more access-restricted zones 5 and that any arrangement of these zones 3, 5 is building specific. Hereinafter, embodiments of the technology are described with a focus on the user 2 requesting an elevator service in a building environment as illustrated in FIG. 1. The skilled person, however, recognizes that the technology described herein is independent of a specific building environment.

In the embodiments described herein, the user 2 presents the credential using a mobile communications device 20 carried by the user 2, wherein the credential is represented using an optical code, in particular a quick response (QR) code. The mobile communications device 20 can be configured as a smartphone commonly used, e. g. for making phone calls, accessing the Internet, taking photos, scanning barcodes or QR codes, and executing a variety of other special-purpose software applications (also referred to as "app"). The software application can be a mobile app to be installed by the user 2, e. g., after downloading it from an app store (i. e., a digital distribution platform for computer software); it can also be an offline web application for access via a browser software. The mobile communications device 20 (smartphone) has a camera 19 and display 21 which may be configured as a touchscreen that allows the user 2 to interact with the mobile communications device 20. Once executed by the mobile communications device 20, an app controls the communications device 20 to generate a graphical user interface (also referred to as "GUI") which is displayed on the display 21. The credential and the app used in connection with the herein described technology are described hereinafter in more detail.

As mentioned above, the building system 1 may be configured to operate according to at least one of the mentioned system implementations and control technologies. Depending on the building system's configuration, at least one credential acquisition device 9 may be provided on a building floor and/or in an elevator car 14*a*. The credential acquisition device 9 may be provided instead of the floor terminals 6*a*, 6*b*, 8, e. g. at the time of installing the building system 1, or in addition to the floor terminals 6*a*, 6*b*, 8, e. g. at the time of installing the building system 1 or at a later time in connection with a modernization of the building system 1. For illustrative purposes, FIG. 1 shows several credential acquisition devices 9 and the floor terminals 6*a*, 6*b*, 8, which may be used independent of the credential acquisition devices 9.

Referring again to the right-hand side of FIG. 1, each one of the elevator cars 14*a* includes such a credential acquisition device 9. The acquisition device 9 may be integrated in the car operating panel 10, or may be a stand-alone component arranged, for example, near the car operating panel 10. In one embodiment, such an acquisition device 9 is also provided on the floor, either integrated in the floor terminal 6*a* or arranged near the floor terminal 6*a*. Referring to the left-hand side of FIG. 1, an acquisition device 9 is either integrated in each one of the floor terminals 8 or arranged near them. It is contemplated that each acquisition device 9 is communicatively coupled to the controller system 18.

Each acquisition device 9 is configured to acquire the optical code displayed on the user's mobile communications device 20. The acquisition device 9 includes optical sensors, e. g., a sensor array, and a processor that decodes the information contained in the optical code. In one embodiment, the optical code is a QR code and the acquisition device 9 is configured to read the QR code; accordingly, the acquisition device 9 comprises a QR code reader, e. g., commercially available types MX86 or QT660 (Beijing Vguang Technology Co., Ltd., China). In certain embodiments, the acquisition device 9 comprises a logic controller (e. g., UNO-2271G (Advantech Co., Ltd., Taiwan)), and an I/O controller (e. g., ADAM-6060 (Advantech Co., Ltd.)), wherein the QR code reader is connected to the logic controller via a digital interfaces (e. g., a USB interface), and wherein the logic controller is connected to the I/O controller via an Ethernet connection. In one embodiment, if the acquisition device 9 is arranged in the elevator car 14*a* of the up/down controlled elevator system, the I/O controller may be connected to the car operating panel 10 or a bus connecting to the controller system 18; the I/O controller outputs a signal indicative of the user's selected destination floor. Correspondingly, if used in a destination call control elevator system, the I/O controller of the acquisition device 9 outputs a signal indicative of the boarding floor and the destination floor. It is contemplated that other implementations with or without an I/O controller or a logic controller, and with components from other manufactures may be used. Further, it is contemplated that decoding of the QR code may be performed by the acquisition device 9 and/or by the controller system 18.

In the embodiment of FIG. 1, the building system 1 includes a registration computer system 4. The registration computer system 4 includes a processing unit 28 (CPU), a user interface 32 (UI), such as computer monitor in connection with a keyboard or a touchscreen, which generate a GUI, and a communications interface 30 (COM). The communications interface 30 couples the registration computer system 4 to a communications network 22 (NW), which communicatively couples the registration computer system 4 to the controller system 18 and a data storage device 24 (DATA). The data storage device 24 may be any device configured to store digital data, for example, a hard disk drive (HDD) or CD/DVD drive, a semiconductor drive/solid state disk (SSD), or combinations thereof, or other digital data memory devices for digital data storage. The communications network 22 may in one embodiment include a wire-based communications bus (e. g., Ethernet); alternatively, a wireless (radio frequency) technology or a combination of wire-based and wireless technologies may be used. Communications over a wire-based communications bus may follow a LON, BACnet or another serial bus protocol. Any other known technology for communications over a wired network may be used. Communications between connected entities, such as the registration computer system 4, the controller system 18 and the data storage device 24 may use bus addresses. In one embodiment, a unique identifier (e. g., a device code, a MAC address, an IP address) is assigned to each one of these entities.

At least one system component of the registration computer system 4, for example, the user interface 32, is located in the public zone 3 so that it is accessible by the user 2. In one embodiment, at least the user interface 32 may be comprised in a housing to form a lobby terminal configured to be mounted on a lobby floor or to a lobby wall. The lobby terminal may be configured as a self-service terminal allowing the user 2 to self-register. In another embodiment, at least the user interface 32 may be provided at a front desk (reception desk) where building personnel (receptionist, security staff) registers the user 2.

Figure 2:
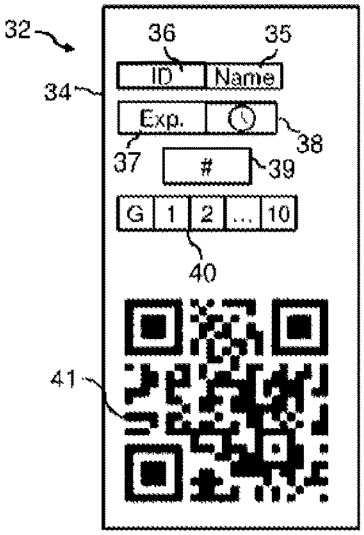
FIG. 2 shows a schematic illustration of an exemplary embodiment of an input mask displayed by a registration computer system of the building system shown in FIG. 1.

The user interface 32 includes, for example, a display device and is configured to display thereon an input mask 34 having a variety of fields 35-41. FIG. 2 shows one embodiment of the input mask 34. During the registration process, these fields 35-41 are filled based on the user 2 providing requested information and/or the registration computer system 4 generating corresponding information. Registration of the user 2 includes, for example, recording a user profile which may include at least one of the user's identity (e. g., name and/or affiliation) (fields 35, 36), floors the user 2 is authorized to access (access rights), names or identifiers of floors (e. g., lobby, parking, restaurant etc.) (fields 39, 40), expiration time or date of the access rights (fields 37, 38), an encryption key, and a site or building identifier. In certain embodiment, the user profile may store the user's travel or call history in the building. The user profile may be stored in the registration computer system 4 and or the data storage device 24.

As described in more detail below, once the user 2 is registered, the registration computer system 4 generates and outputs an activation code, e. g. via the user interface 32. In the embodiment described herein in more detail, the activation code is displayed as an optical code (e. g., as a QR code) on the user interface 32 (field 41 in FIG. 2) so that the user 2 can scan it using the mobile communications device 20, for example, the camera 19 of the mobile communications device 20 may be used to scan the optical code. In another embodiment, the activation code may be transmitted to the user's mobile communications device 20, e. g., the user interface 32 applying NFC or Bluetooth technology.

If the activation code is generated in consideration of an expiration time or date, the activation code expires at the expiration time or date specified in the fields 37, 38. After expiration, the activation code can no longer be used. In one embodiment, any activation code stored in the user profile may be marked as invalid. In addition, the app on the mobile communications device 20 is configured to prevent that the activation code is stored on the mobile communications device 20 for potential future use after the set expiration time or date.

In the situation shown in FIG. 1, the technology described herein may be advantageously used to operate the building system 1 without the user 2 having to touch a public, potentially bacteria/virus contaminated button or touchscreen so that the user 2 feels more confident using one or more services provided by the building system 1. In addition, the activation code used according to the technology described herein provides essentially all information required for using the services. The user's mobile communications device 20 does not require an active radio communications connection with the building system 1, i. e., for using the services, the user's mobile communications device 20 is offline. Summarized and by way of example, the building system 1 according to one exemplary embodiment, the registration computer system 4 generates and stores an activation code for the user 2 requesting elevator service. The activation code (in particular in form of a QR code) codes user information including at least one of a user identity, an encryption key and access rights of the user 2 in the building (incl. any expiration date or time). The user 2 uses the mobile communications device 20 and the installed software application (APP) to scan the activation code. The app generates a graphical user interface 23 on a display 21 of the mobile communications device 20, wherein displayed content of the graphical user interface 23 is determined by the coded user information of the activation code; for example, identifiers (e.g., floor names or floor numbers) of only those floors are displayed the user 2 is allowed to access. The displayed content includes further an optical credential (in particular in form of a QR code). To request elevator service, the user 2 holds the mobile communications device 20 to the credential acquisition device 9 so that it can scan the optical credential. In response to determining that the presented credential is valid, the building system 1 causes the elevator service to be performed according to one of the above-mentioned control technologies.

While certain embodiments of the technology disclosed herein are described with reference to a QR code and a device configured to scan or read the QR code, it is contemplated that another type of optical code may be used as well, for example, a 2D codes (e. g., a stacked 2D code, a DataMatrix code, an Aztec code or a dotcode) or a color code described in WO 2015/049186 A1. Further, it is contemplated that the software app of the mobile communications device 20 may display a static or dynamic optical credential. To display a dynamic optical credential (e. g., a dynamic QR code), the software application generates a new optical credential at a set frequency, e. g., every minute. Such a dynamic optical credential may be used to restrict copying of the optical credential and sharing it with other users.

As mentioned above, the activation code encodes the encryption key, which is a unique system-generated key; i. e., the registration computer system 4 generates the encryption key specifically for the user 2 and the instant elevator service request at about the time of generating the activation code for the user 2. Once it is generated, it is stored in the registration computer system 4 or the data storage device 24 in connection the user profile. The activation code, therefore, provides that the encryption key is conveyed to the mobile communications device 20; with that, the activation code essentially instructs the mobile communications device 20 (or its app) how it must encode the optical credential. According to the technology described herein, the encryption key is then used by the mobile communications device 20 to encode the optical credential. After the optical credential has been read by the credential acquisition device 9, the encryption key is used by the controller system 18 of the building system 1 to verify the optical credential. A validly encrypted optical credential can only be generated by that particular mobile communications device 20. This also restricts copying of the optical credential and sharing it with other users. Further, the technology described herein provides improved security for the building system 1 as a whole in case the activation code and/or the optical credential are subject to hacking. Since the encryption key is unique and specific for the user 2 and the instant service request, obtaining the encryption key affects only the hacked activation code or optical credential, but not other codes or credentials, in particular because the registration computer system generates a new and independent encryption key for each elevator service request.

Figure 3:
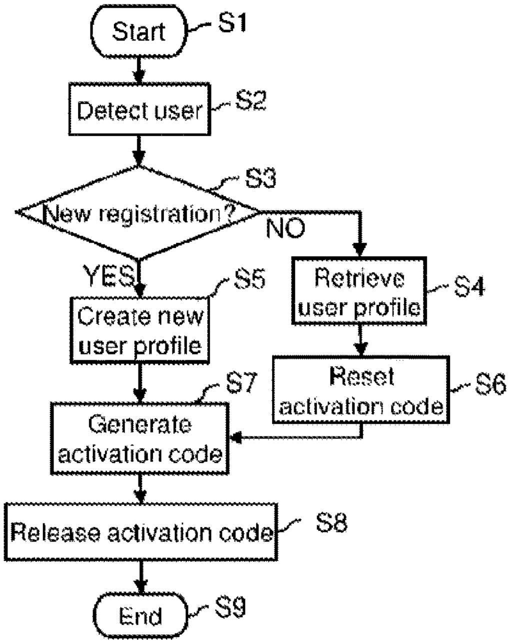
FIG. 3 shows a flow chart of an exemplary embodiment of a method of operating the building system.

With the understanding of the basic system components and their functionalities described above with reference to FIG. 1 and FIG. 2, a description of an exemplary method of operating the building system 1 is provided hereinafter in connection with FIG. 3. The description is made with reference to a user 2 who wants to use an elevator in the building. The exemplary shown method begins with a step S1 and ends with a step S9.

At a step S2, the user 2 is detected. The user 2 may be detected by the registration computer system 4 when the user 2 at a self-service terminal or a receptionist at a front desk begins interacting with the registration computer systems 4. The self-service terminal, for example, may be in an inactive or stand-by state and become activated by the user 2. The interaction may include, for example, touching the user interface 32 and/or selecting a touch-sensitive field for a new registration or one for a recurring user.

Proceeding to a step S3, it is determined if a new registration is requested. If a new registration is requested, the procedure proceeds along the YES branch to a step S5. A new registration is not necessary if the user 2 is deemed a recurring or known user, i. e., a user 2 that requested elevator service prior to the instant request, e. g., because the user 2 lives or works in the building or is a regular visitor. In this case, the procedure proceeds along the NO branch to a step S4.

At the step S5, a new user profile is created for the user 2. As explained above with reference to the input mask 34 illustrated in FIG. 2, during the registration process the fields 35-41 are filled based on the user 2 providing requested information and/or the registration computer system 4 generating corresponding information. The user profile may include at least one of the user's identity (e. g., name and/or affiliation, user ID) (fields 35, 36), floors the user 2 is authorized to access (access rights), names or identifiers of floors (e. g., lobby, parking, restaurant etc.) (fields 39, 40), expiration time or date of the access rights (fields 37, 38), an encryption key, and a site or building identifier.

For such a recurring user 2 a user profile may already be stored in the building system 1.

If the user 2 is a recurring user, the user's existing (stored) user profile is retrieved in the step S4. To enable retrieval of the stored user profile, input of the user's name or user ID are required. With that information, the registration computer system 4 can search for the user profile.

Proceeding to a step S6, any previously generated activation code and stored in the user profile is reset; it is invalid and may be deleted from the user profile.

At a step S7, which follows the step S5 as well as the step S6, an activation code is generated. The generation of the activation code is user specific and based on the information contained in the user profile. The content of the activation code is stored in the registration computer system 4 and/or the data storage device 24. At the time the building system 1 and/or the registration computer system 4 are configured, or at any other time, it may be specified which information of the user profile is to be encoded in the activation code. Exemplary information to be encoded is shown in FIG. 2. In one embodiment, the processing unit 28 executes a software program that reads the information from the user profile, uses the information to create a data string to be encoded and encodes the information into a QR code. The software program is also referred to as a QR coder generator.

Proceeding to a step S8, the activation code is released. Releasing the activation code makes the activation code available to the user 2. As mentioned above, in one embodiment, the activation code is made available as a QR code displayed on the user interface 32 (field 41 in FIG. 2) so that the user 2 can scan it using the mobile communications device 20. Once the activation code is released, the method shown in FIG. 3 and concerning one aspect of operating the building system 1 ends at the step S9.

Use of the activation code obtained by the user's mobile communications device 20 is described hereinafter with reference to FIGS. 4A-FIG. 6B. In connection with these figures, it is assumed that the registration computer system 4 generated and released an activation code for the user 2 and that the user 2 activated the software application of the mobile communications device 20. During the registration process, the user's access rights and the validity (expiration) of the activation code are set. In FIGS. 4A-FIG. 6B, the display 21 of the mobile communications device 20 displays various embodiments of graphical user interfaces 23 (GUI) at different stages of use of the mobile communications device 20 by the user 2. It is contemplated the app being executed on the mobile communications device 20 controls the GUI 23.

FIG. 4A-FIG. 4D illustrate the use of the mobile communications device 20 in connection with a building system 1 that operates according to the conventional up/down control technology. As shown on the right-hand side of FIG. 1, the building system 1 is equipped with the floor terminal 6*a*, the car operating panel 10 and a credential acquisition device 9 on the floor and in the elevator car 14.

Figure 4A:
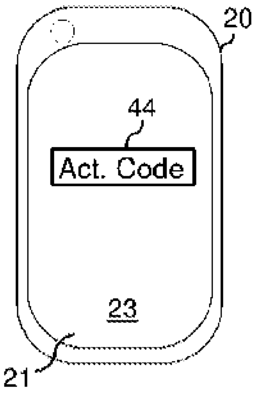
FIGS. 4A-4D show a first embodiment of a graphical user interface displayed on a user's mobile communications device for use with an up/down elevator control technology.
Figure 4B:
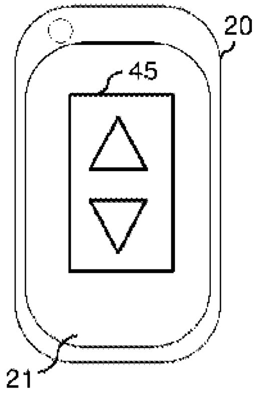

In FIG. 4A, the GUI 23 displays a field 44 (Act. Code) the user 2 can touch to scan the activation code released by the registration computer system 4. At the time, the user 2 may be standing at the self-service terminal or the front desk. In response to the activation code having been scanned, the GUI 23 displays a field 45 indicating a symbol for the upward direction and a symbol for the downward direction, as shown in FIG. 4B. The symbols may be triangles, arrows or any other directional symbols. In certain embodiments, the symbols may be supplemented with letters or text, or replaced by letters or text. The user 2 can touch one of these symbols shown in FIG. 4B to select the travel direction, for example, while approaching or being in front of the elevator (elevator car 14*a*).

Figure 4C:
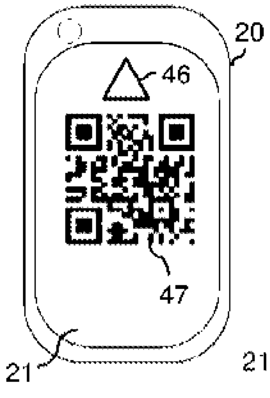

In the embodiment shown in FIG. 4C, the GUI 23 displays a field 45 that indicates the user's selected travel direction (here, upwards) and a field 47 that contains a QR code. The QR code encodes the selected travel direction and at least one of the above-mentioned access rights and validity information. To call an elevator to the boarding floor, the user 2 holds the mobile communications device 20 to the credential acquisition device 9 in the vicinity of the floor terminal 6*a* so that the QR code can be read. In response to the elevator call, the controller system 18 causes the elevator car 14*a*, for example, to the move to the boarding floor so that the user 2 can board the elevator car 14*a* there.

Figure 4D:
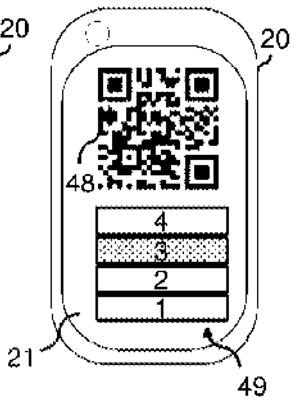

Referring to FIG. 4D, once the user 2 is in the elevator car 14*a*, the user 2 can touch the display 21 and, in response, the GUI 23 displays a field 49 that contains a list of floors from which the user 2 can select the desired destination floor. The GUI 23 generates the list of floors based on the access rights assigned to the user 2 and encoded in the activation code. Hence, the list contains only floors the user 2 is allowed to access.

The individual floors may be represented through numbers (as in FIG. 4D) or any other identifier suitable to distinguish the floors. It is contemplated that instead of a list, any other presentation of the floors may be implemented, e. g. in form of a matrix or a ring/wheel. The app and/or the GUI 23 are configured to allow the user 2 to scroll through the list until the desired destination floor is displayed. The user 2 can then touch the number of the desired destination floor. In the example shown in FIG. 4D, the selected floor number "3" is shaded. In response to that, the GUI 23 displays a field 48 that contains a QR code. The QR code encodes the selected destination floor and at least one of the above-mentioned access rights and validity information. To enter the destination floor, the user 2 holds the mobile communications device 20 to the credential acquisition device 9 in the elevator car 14*a* so that the QR code can be read. In response to that, the controller system 18 causes the elevator car 14*a* to the move from the boarding floor to the destination floor.

Figure 5A:
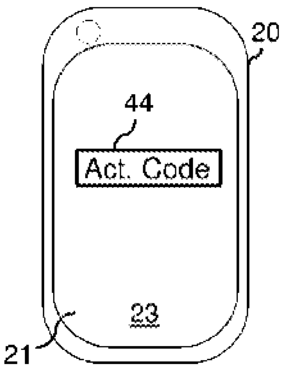
Figure 5B:
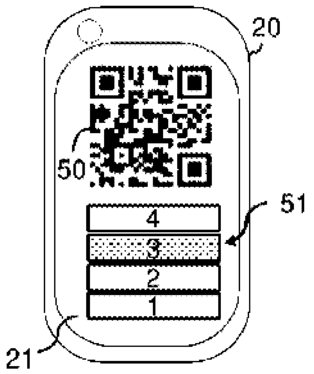

FIG. 5A and FIG. 5B illustrate the use of the mobile communications device 20 in connection with a building system 1 that operates also according to the conventional up/down control technology. As shown on the right-hand side of FIG. 1, the building system 1 is in this embodiment equipped with the floor terminal 6*b*, the car operating panel 10 and a credential acquisition device 9 (only) in the elevator car 14*a*. In this embodiment, the user 2 calls the elevator to the boarding floor without using the mobile communications device 20. Instead, the user 2 is required to select and activate one of the directional symbols of the floor terminal 6*b*. For that purpose, the floor terminal 6*b* may be equipped with proximity sensors (e. g., one for each direction) that allow selection of the direction without the user 2 having to actually touch the floor terminal 6*b*. As is known in the art, proximity sensors may be configured, for example, as capacitive proximity sensors or photoelectric sensors. Alternatively, the floor terminal 6*b* may have conventional directional push buttons; to reduce the risk of spreading bacteria and/or viruses, the user 2, however, may be required to wear a glove to touch a push button or to use an elbow for pushing the button.

In FIG. 5A, the GUI 23 displays the field 44 (Act. Code) as described above with reference to FIG. 4A. Subsequently, the GUI 23 displays the fields 50, 51, as shown in FIG. 5B. These fields 50, 51 correspond to the fields 48, 49 described above with reference to FIG. 4D. After selecting the desired destination floor, the user 2 can present the displayed QR code (field 50) to the credential acquisition device 9 in the elevator car 14*a* so that the QR code can be read. In response, the controller system 18 causes the elevator car 14*a* to the move from the boarding floor to the destination floor.

Figure 6A:
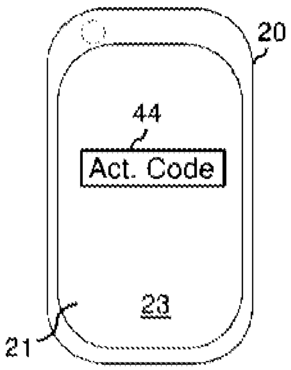
FIGS. 6A-6B show a third embodiment of a graphical user interface displayed on the user's mobile communications device for use with a destination call control technology.
Figure 6B:
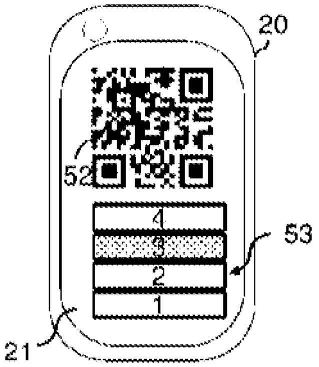

FIG. 6A and FIG. 6B illustrate the use of the mobile communications device 20 in connection with a building system 1 that operates according to the destination call control technology. As shown on the left-hand side of FIG. 1, the building system 1 is in this embodiment equipped with the floor terminal 8 and a credential acquisition device 9 on the floor. In FIG. 6A, the GUI 23 displays the field 44 (Act. Code) as described above with reference to FIG. 4A. Subsequently, the GUI 23 displays the fields 52, 53, as shown in FIG. 6B.

While the user 2 is on the boarding floor, the user 2 selects the desired destination floor from the floors displayed in the field 53. In response, the GUI 23 generates the QR code displayed in the field 52. After selecting the desired destination floor and while still on the boarding floor, the user 2 can present the displayed QR code (field 52) to the credential acquisition device 9 located on the boarding floor (outside the elevator car 14) so that the QR code can be read. In response, the controller system 18 causes the elevator car 14, for example, to move to the boarding floor to allow the user 2 to board elevator car 14, and then to move from the boarding floor to the destination floor.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A building system having an elevator system that includes a controller system configured to control the elevator system to move an elevator car between floors of a building, the building system comprising:

a registration computer system communicatively coupled to the controller system and configured to generate an activation code for a user requesting elevator service, to store data associated with the activation code, the registration computer system having at least one system component user-accessibly located in a public zone of the building;

wherein the generated activation code encodes user information including at least one of a user identity, an encryption key and access rights of the user in the building, and wherein the generated activation code is adapted to activate, upon being provided to a mobile communications device of the user located in proximity of the at least one system component, a software application installed on and being executable by the mobile communications device;

the activated software application configured to generates a graphical user interface on a display of the mobile communications device, wherein displayed content of the graphical user interface is predetermined solely by the coded user information of the activation code, and wherein the software application is further configured to generate an optical credential upon the user specifying the elevator service, the optical credential including the user information; and a credential acquisition unit communicatively coupled to the controller system and configured to acquire the optical credential from the mobile communications device when presented by the user to the credential acquisition unit, the controller system being configured to cause the elevator system to perform the specified elevator service upon determining that the optical credential is valid.

2. The building system according to claim 1, wherein the controller system is further configured to controls the elevator system according to an up/down control technology, wherein a first credential acquisition unit is arranged on a building floor to provide for entry of a floor call specifying a travel direction and calling an elevator car to the building floor, and wherein a second credential acquisition unit is arranged in the elevator car to provide for entry of a car call specifying a destination floor.

3. The building system according to claim 1, wherein the controller system is further configured to controls the elevator system according to an up/down control technology, wherein a first floor terminal having directional push-buttons is arranged on a building floor to provide for entry of a floor call specifying a travel direction and calling an elevator car to the building floor, and wherein the credential acquisition unit is arranged in the elevator car to provide for entry of a car call specifying a destination floor.

4. The building system according to claim 1, wherein the controller system is further configured to controls the elevator system according to a destination call control technology, and wherein the credential acquisition unit is arranged on a building floor to provide for entry of a floor call specifying a destination floor and calling an elevator car to the building floor.

5. The building system according to claim 1, further comprising a physical access control system configured to control access from a public zone to an access-restricted zone and to determine if the optical credential is valid for the user.

6. The building system according to claim 1, wherein the at least one system component of the registration computer system user-accessibly located in the public zone of the building is a user interface integrated in a self-service terminal located in a lobby of the building, or arranged at a front desk operated by building personnel.

7. The building system according to claim 6, wherein the user interface is configured to displays the activation code as a QR code.

8. The building system according to claim 1, wherein the optical credential is displayed as a QR code by the graphical user interface.

9. The building system according to claim 1, further comprising a communications network, wherein the registration computer system and the controller system are communicatively coupled to the communications network.

10. The building system according to claim 9, further comprising a data storage device communicatively coupled to the controller system, wherein the data storage device stores the activation code and the user information, and the controller system is configured to read data from the data storage device.

11. A method of operating a building system having an elevator system, the building system comprising a controller system configured to control the elevator system, a registration computer system communicatively coupled to the controller system, and a credential acquisition unit communicatively coupled to the controller system, the method comprising:

generating, by the registration computer system, an activation code based on information contained in a user profile stored for a user requesting elevator service, wherein data associated with the activation code is stored in the registration computer system, wherein the activation code encodes user information including at least one of a user identity, an encryption key and access rights of the user in the building;

releasing the activation code, by the registration computer system, on a system component of the registration computer system that is user-accessibly located in a public zone of the building, to be obtained by a mobile communications device of the user, wherein the obtained activation code activates a software application installed on and being executable by the mobile communications device, wherein the activated software application generates a graphical user interface on a display of the mobile communications device, wherein displayed content of the graphical user interface is predetermined solely by the coded user information of the activation code, wherein the activated software application further generates and displays an optical credential upon the user requesting specifying an elevator service, wherein the optical credential includes the user information;

acquiring, by the credential acquisition unit, the optical credential from the mobile communications device when presented by the user; and controlling, by the controller system, the elevator system to perform the specified elevator service upon determining that the optical credential is valid for the user.

12. The method according to claim 11, wherein releasing the activation code includes displaying a QR code using a user interface of the registration computer system.

13. The method according to claim 12, wherein acquiring the optical credential includes reading a QR code displayed on a display of the mobile communications device and generated by the software application based on the user information contained in the QR code.

14. The method according to claim 11, wherein the controller system controls the elevator system according to an up/down control technology, wherein the elevator service specifies a travel direction or a destination floor, or wherein the controller system controls the elevator system according to a destination call control technology, wherein the elevator service specifies a destination floor.

15. The method according to claim 11, wherein, in response to the activation code, the graphical user interface displays the predetermined content without obtaining additional information external to the mobile communications device.

* * * * *